United States Patent [19]

Lin et al.

[11] 4,228,578
[45] Oct. 21, 1980

[54] METHOD FOR OFF-ORIENTATION POINT ROTATION SAWING OF CRYSTALLINE ROD MATERIAL

[75] Inventors: Lawrence Y. Lin; Henry W. Gutsche; James A. Collier, all of St. Louis, Mo.

[73] Assignee: Monsanto Company, St. Louis, Mo.

[21] Appl. No.: 3,563

[22] Filed: Jan. 15, 1979

[51] Int. Cl.² .................. B23P 17/00; H01L 7/66; B25B 1/00
[52] U.S. Cl. ..................... 29/423; 29/527.2; 269/7; 29/583; 29/424
[58] Field of Search ............ 269/7; 29/583, 527.2, 29/423, 424

[56] References Cited

U.S. PATENT DOCUMENTS

| | | | |
|---|---|---|---|
| 2,430,969 | 11/1947 | Young | 269/7 |
| 4,110,885 | 9/1978 | Fisher | 269/7 |
| 4,174,561 | 11/1979 | House et al. | 29/583 |

OTHER PUBLICATIONS

Cutting a Monocrystalline Semiconductor, Fischer et al., "IBM Technical Disclosure Bulletin", vol. 10, No. 2, Jul. 1967.

Primary Examiner—Ervin M. Combs
Assistant Examiner—V. K. Rising
Attorney, Agent, or Firm—Henry Croskell

[57] ABSTRACT

A method is provided for point rotation sawing of crystalline rod material at off-orientation angles wherein the crystalline rod is encapsulated in a molding media forming a cylindrical geometric encapsulation containing the rod with its crystallographic axis at an angle to the cylindrical axis of encapsulation, the angle coinciding with the off-orientation requirement. The encapsulation cylinder is rotated about its axis and contacted by sawing means at one or more points tangent to the cylinder surface and perpendicular to the cylinder's axis of rotation resulting in the sawing of a thin wafer from a cylinder which is inclusive of an off-orientation crystalline material wafer. Inside and outside diameter saws having sidewall lapping coatings provide an off-orientation point sawing method with simultaneous sawing and lapping of the resulting thin wafers as the point contact diameter becomes smaller; however, the off-orientation point sawing method utilizing the rotating cylinder is adaptable to a variety of sawing means.

18 Claims, 3 Drawing Figures

METHOD FOR OFF-ORIENTATION POINT ROTATION SAWING OF CRYSTALLINE ROD MATERIAL

BACKGROUND OF THE INVENTION

The invention relates to a method for point rotation sawing of crystalline rod material at off-orientation angles. In another aspect the invention relates to a method for sawing cylindrically shaped bodies transversely of their longitudinal axis wherein the cylindrically shaped bodies contain a crystalline rod with its crystallographic axis at an angle to the cylindrical axis of the encapsulation.

Inasmuch as the invention has particular importance and advantages in its application to the sawing of semiconductor crystals and to slices at off-orientation angles, it will be described in this environment by way of example. However it will be appreciated that the method may be employed with advantage wherever it is necessary to point saw rotating rods at off-orientation angles.

In the commercial production of semiconductor devices, the semiconductor material is initially prepared in relatively large monocrystalline ingots or rods by one or several known methods such as the Czochralski process, float zone, or the like. The ingot usually is of a rod-like configuration and the first step toward its subdivision, ultimately to form wafers utilizing the semiconductor devices is to saw the ingot transversely to thin slices i.e. wafers. This process is usually accomplished at the present time by means of rotary diamond saws which in the simplest form, consists of an inside diameter saw disk surrounding a rod workpiece which is mounted in a stationary position while the inside diameter saw is rotatably driven into contact and through the workpiece.

The use of semiconductor wafers in the electronics industry has become wide-spread for a number of different commercial and technological purposes. These wafers are extremely thin, typically in the order of 0.015 inches or less in thickness for silicon and may range upward in size in diameter of 3 to 5 inches or more. Such wafers are cut from ingot of crystal material which have been grown specifically for the purpose of providing materials to be used in thin wafer form. The uniformity of size and surface of the cut wafers is extremely important; thus the method is needed which can repeatedly cut wafers of desired precise thicknesses having smooth unscarred surfaces. Of importance is a method which will provide such wafers minimizing breakage problems which exist in prior sawing methods.

Presently semiconductor crystal slicing is done by the use of inside diameter cutting saws supplied to a fixed semiconductor rod mounted on the saw exit side in carbon or suitable epoxy materials. The inside diameter sawing of the fixed rod permits the use of a thin circular steel saw plate. As the inside diameter saw proceeds through the cutting path, increasing the saw to crystal rod contact, lengths occur resulting in crystal particles buildup which rubs against the crystal face requiring additional horsepower and resulting in scarred wafer surfaces. Other problems arise from the crystal particle buildup such as flat cuts, irregularly shaped slices and the like. The major force, i.e., energy required in inside diameter slicing or sawing of fixed workpieces is accountable to the buildup of sawed crystal materials along the length of the blade to crystal rod interface. This resulting crystal debris is not readily removed from the interface creating additional friction which results in increasing energy requirements. These inside diameter sawing techniques utilize a thin disk with a comparatively large hole in the center which is tightly stressed outwardly and mounted in a rotating head. The inner rim of the center hole is coated with diamond particles embedded in a nickle matrix and serves as the cutting edge. The semiconductor material to be utilized is drawn into the spinning inner rim where wafers of the materials are sawed. These inside diameter sawing techniques frequently result in the breakage of wafers or splintering from the crystal rod as the inside diameter saw approaches slicing completion and exits from the outside of the rod. The slice actually breaks off the rod before the blade has entirely cut through the rod. The rod being held on a carbon or other satisfactory material mounting block which also functions to hold in place the resulting sawed wafer. Wafer breakage, edge chipping, slant sawing, and scarred or marred wafer surfaces promote low operational yield in the semiconductor industry. Presently used inside diameter sawing techniques also fail generally in sawing other semiconductor materials such as sapphire. Thin inside diameter blade sawing of very hard mineral materials such as sapphire substantially destroys the blade after only a few wafers are sliced due to the hardness and degree of difficulty of slicing a non-rotating rod.

The point sawing of crystal rod materials wherein the semiconductor rods are rotating during the sawing process provides the desirable direction of these problems resulting in a minimization of waste ingot material and improved wafer quality. The improvements are achieved while the method also provides an utmost important capability of repeated slicing utilizing the sawing and/or lapping means wherein the sliced wafers exhibit uniformity of thickness, high surface quality resulting from the sawing method which provides efficient manufacturing operations. Point sawing of rotating crystal rod methods do not completely satisfy needs of the semiconductor market since the crystallographic orientation of the produced wafers varies with utilization by the industry. Particularly in the use of silicon crystal material, the crystallographic orientation desired by users of the produced wafers may vary from about 0 to about 4 degrees from the (1, 1, 1) or (1, 0, 0) crystallographic plane. Wafers obtained by present methods of rotating point sawing do not have, for example, the critical 0 to 4 degrees off-orientation angle which is necessary for use in certain semiconductor devices.

SUMMARY OF THE INVENTION

Accordingly, it is an object of the present invention to provide a point rotating sawing method for sawing crystalline rod material at off-orientation angles. It is still another object of the present invention to provide a method for simultaneously sawing and lapping thin wafers at off-orientation angles from cylindrical rod semiconductor materials wherein the rotating rod in a non-axial rotation position is point contacted with the sawing and lapping means at one or more points. Specifically, it is a contemplation of the present invention to provide a method which will enable off-orientation point sawing and lapping of thin wafers from rods of semiconductor crystal material with consistent quality while permitting faster sawing rate, longer blade life and less power requirement.

These and other objects accomplished by method of point rotation sawing of crystalline rod material at off-orientation angles wherein the produced wafers have the proper crystallographic orientation. The semiconductor rod is prepared for off-orientation point sawing by determining the orientation angle through x-ray diffraction means, sawing one end of the crystalline rod along the predetermined angle and mounting the rod upon a bearing surface, followed by encapsulation of the mounted rod in a molding media forming a cylindrical geometric encapsulation containing the rod with its crystallographic axis at an angle to the cylindrical axis of the encapsulation. The encapsulation cylinder is then rotated while maintaining the semiconductor rod at the appropriate, predetermined angle therein, and engaging the rotating encapsulation cylinder with a sawing means at one or more points tangent to the cylinder surface and perpendicular to the cylinder axis of rotation. The encapsulation cylinder and sawing means are positioned in constant rotation contact resulting in the sawing separation of a thin wafer from the cylinder which is inclusive of off-orientation crystal material wafer. The wafers so produced can also be simultaneously lapped if the sawing means is provided with surface lapping coatings. The lapping coatings can extend outwardly from the cutting surface. The wafers obtained by this sawing method according to the invention are flat, parallel and with improved smoothness if lapped simultaneous during sawing and having relatively few lattice distortions. The wafers may be directly polished without the conventional lapping step to form a wafer having a smooth, flat surface that is substantially defect free.

In accordance with a preferred embodiment of the invention there is provided a method of point sawing of semiconductor crystal rod materials at off-orientation angles and optionally lapping the resulting wafers simultaneously with the sawing step. Several sawing means can be utilized according to the invention such as inside diameter or outside diameter sawing which can also include lapping surfaces on the blade sides. As the inside diameter or outside diameter saws make point contact and proceed through the rod to a final and center point contact, the lapping surfaces provide constant lapping of the sliced wafer while also lapping one surface of the next wafer to be sliced. The point contact is achieved through rotation of the semiconductor crystal rod which has been prepared for off-orientation slicing through encapsulation means. One preferred embodiment provides rotation of the crystal rod encapsulation workpiece counter to the rotation of the sawing means. The point contact sawing prevents no buildup of crystalline residual materials while eliminating undue side forces or pressure from the crystal rod face i.e., slant cutting. Point contact off-orientation sawing method requires less energy and can be conducted at higher speeds than conventional inside diameter sawing of fixed workpiece rods. A significant result of off-orientation point sawing of rotating workpieces is the elimination of edge chipping while at the same time permitting higher speed and improved wafer quality.

The method according to the invention in a preferred embodiment varies the plunge rate of the sawing means through the point rotation sawing of the off-orientation wafer. Present methods using inside diameter sawing of stationary workpieces permits slant sawing through the blade angulation of off-orientation materials without consideration as to varying plunge rate conditions. In order to expedite and utilize the advantages of point rotation sawing, variation of plunge rates through saw means motor speeds controlled either through mechanical or electrical cam means permits maximum material removal utilizing inside diameter or outside diameter saws. A preferred embodiment of the inventive method utilizes a moving saw head at a pre-programmed plunge rate which is varied generally through varying the power to the saw motors thus varying the speed. The pre-controlled profile is based on the geometric profile of the saw-workpiece relationship i.e., upon first point contact of the sawing means and the workpiece, the plunge rate is at slowest mode as opposed to the near completion point contact wherein the plunge rate is at its maximum rate of plunge. The utilization of these variable controlled plunge rates permits faster sawing of the same geometric proportions than are achievable through the art known systems, i.e. fixed workpiece, moving saw heads which have constant plunge rates.

DESCRIPTION OF THE ILLUSTRATIVE EMBODIMENT

Figure 1:
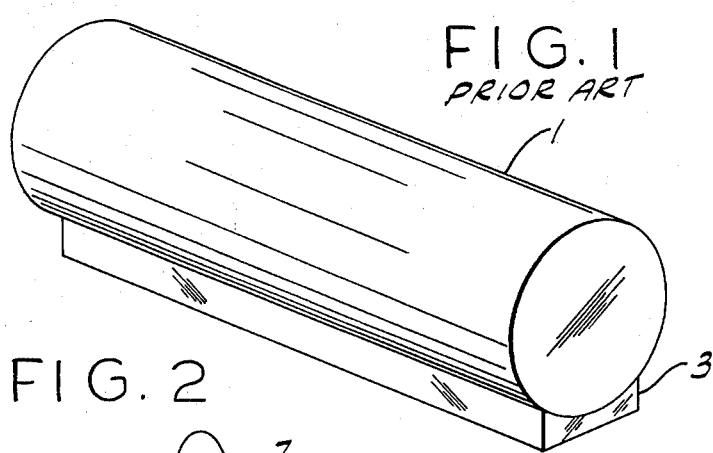
FIG. 1 is a perspective view showing a crystal rod mounted for non-rotation sawing as found in the art.

As shown in the prior art representation, FIG. 1, a crystal rod 1 is affixed to a mounting face 3 which is comprised of carbon or some epoxy or plastic media. Present sawing means utilizing inside diameter saw heads with the crystal rod 1 saw through the crystal rod workpiece 1 with constant plunge rate which can create chipping upon exit of the saw as it saws through the rod 1 and into the mounting material of face 3.

Figure 2:
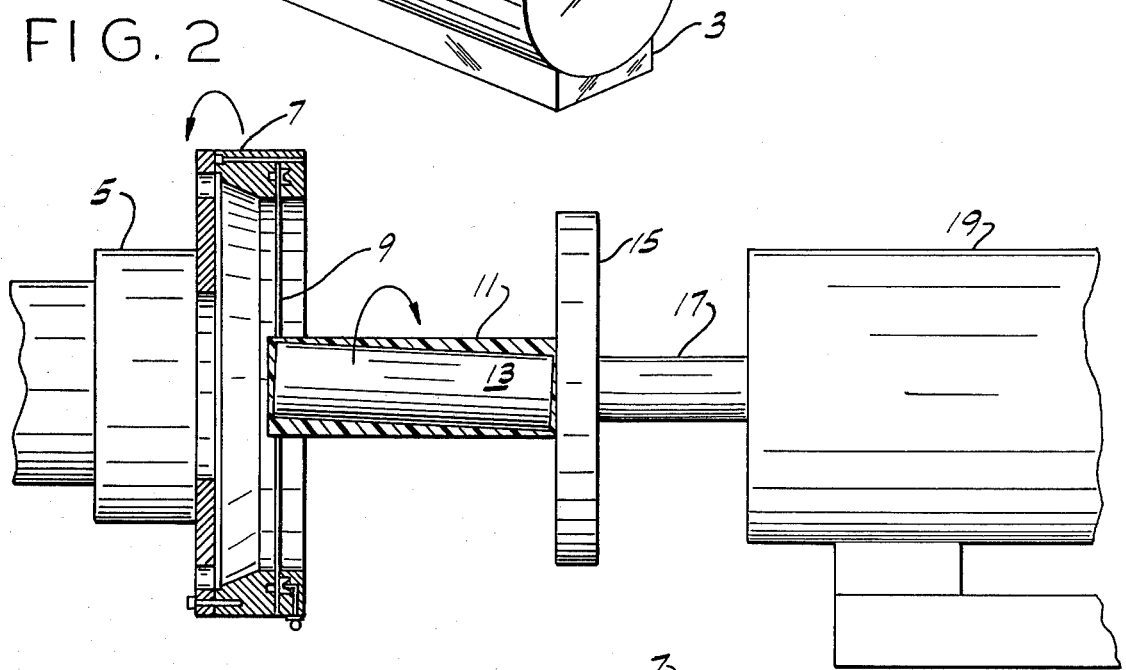
FIG. 2 is a perspective view showing an off-orientation crystal rod mounted in an appropriate encapsulation material for rotation sawing in cross-sections, said encapsulated rod rotatably mounted in an inside diameter sawing apparatus with a saw blade and head in sections.

The crystallographic orientation of the crystal rod 13 as shown in FIG. 2 is determined by suitable means, for example by the conventional x-ray technique. After the crystallographic orientation of the rod 13 has been determined, one end of the rod is sawed along the line of the necessary angles for off-orientation mounting of the rod onto workpiece mounting head 15. The crystallographic orientation axis and the longitudinal axis or axis of rotation of the encapsulation cylinder 11 permit rotation point sawing at off-orientation angles within close tolerances. The method according to the invention permits the simple alignment of the off-orientation crystal rod 13 in the encapsulation cylinder 11 which has a longitudinal axis i.e., axis of rotation differing from the axis of rotation of the crystal rod. The resultant wafers are comprised in part of the encapsulation media and the crystal material at an off-orientation crystallographic orientation.

The mounting of off-orientation mounted crystal rod 13 onto workpiece mounting head 15 is accomplished after the crystal rod has been sawed on one end at a predetermined angle which will afford the off-orientation adaptation. Off-orientation crystal rod 13 once mounted on workpiece mounting head 15 and then be simply encapsulated by appropriate means by encapsulation cylinder 11. The media forming encapsulating cylinder 11 necessarily must be similar to the crystal material of rod 13 in physical parameters such as proficient of expansion, hardness, density, brittleness and the like and must be of a nature which will sufficiently adhere to the surface of the crystal workpiece, such as silicon. In general several commercially available cements, acrylics, epoxies, silicas and mixtures thereof are available which generally fit these physical parameter needs. Forming and shaping of the encapsulating cylinder 11 is very easily achieved once the off-orientation mounted crystal rod 13 is in place on workpiece mounting head 15, for example, by emmersing said rod 13 in a can or container filled with the media, then curing the media in place surrounding rod 13 and forming encapsulation cylinder 11.

Figure 3:
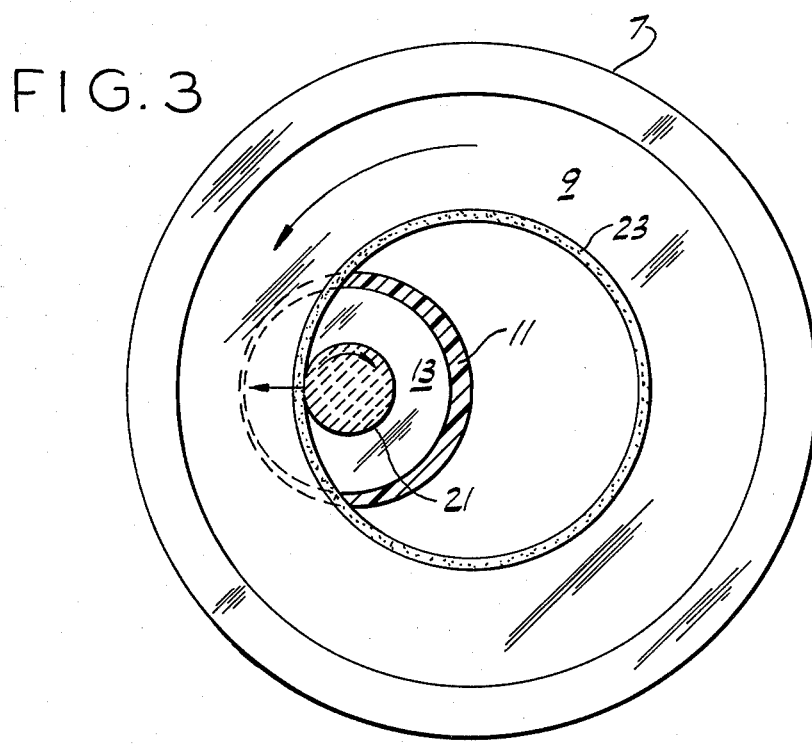
FIG. 3 is a sectional end view of an off-orientation mounted crystal rod partially sawed with the inside diameter saw in point contact with the rotating workpiece.

The sectional end view of FIG. 3 clearly illustrates the off-orientation mounting of rod 13 and encapsulation cylinder 11. As the inside diameter saw means 9, blade 23 stays in constant point contact with unsawed crystal rod portion 21, an off-orientation wafer is produced. Preferably the rotation of the inside diameter saw means 9 is counter the rotation of encapsulation cylinder 11 which permits freer removal of saw residual materials and greater efficiency as to control plunge rate. During the sawing operation, cooling and/or lubricant fluid can be directed against the off-orientation mounted crystal rod when contact with inside diameter saw means 9. Typically the workpiece is rotated at from about 20 to 300 or 400 rpm while the inside diameter saw blade has speeds of about 1,000 to about 5,000 feet per minute. Alternatively, the encapsulation cylinder 11 may be rotated in the same direction as the cutting blade rotation with speed differentials being maintained through bearing means.

As an alternative embodiment of the invention, the inside diameter saw means 9 can have lapping surfaces extended outwardly from drawing surface 23. Such lapping surfaces provide lapping on the wafer sawed as well as the surface of the next wafer to be sawed yielding improved flatness and parallellism of the wafers as well as reducing surface damage and can permit the wafer to be polished directly without lapping the wafer surfaces at a later treatment point. The lapping surface adaptation is applicable with inside or outside diameter sawing means; however, such lapping is not necessary for improved flatness and parallellism of the wafers produced by the invention. Other sawing means which are applicable according to the invention would be multiple-wire or blade sawing apparatus which can contact a rotating cylinder at one or more points tangent to the cylinder surface and perpendicular to the cylinder's axis of rotation.

The process is particularly useful for single crystal materials whether hard or soft in relationship such as garnet, sapphire and the like as well as softer single crystal materials such as silicon and germanium. In the harder materials the process according to the invention permits longer blades while providing an easier method of sawing the wafer i.e., faster. In both hard and softer single crystal material applications, flatness and parallelism are also enhanced over conventional sawing techniques.

Although a preferred embodiment of this invention has been described, it is understood that numerous variations may be made in accordance with the principles of the invention.

We claim:
1. A method for point rotation sawing of crystalline rod material at off-orientation angles comprising:
    determining the off-orientation angle of the rod crystallographic axis;
    encapsulating the rod in a molding media forming a cylindrical geometric encapsulation containing the rod with its crystallographic axis at an angle to the cylindrical axis of the encapsulation, the angle being substantially equal to the predetermined off-orientation angle;
    rotating the cylinder about its axis;
    contacting the rotating cylinder with a sawing means at one or more points tangent to the cylinder surface and perpendicular to the cylinder's axis of rotation;
    positioning the sawing means and the cylinder in constant rotating point contact; and
    sawing a thin wafer from the cylinder which is inclusive of an off-orientation crystalline material wafer.
2. The method according to claim 1 wherein the constant rotating point, off-orientation sawing plunge rate is varied through control means.
3. The method according to claim 1 wherein the sawing means is comprised of an inside diameter saw.
4. The method according to claim 3 wherein the rotating cylinder is constantly moved into position against the inside diameter sawing means.
5. The method according to claim 3 wherein the inside diameter sawing means is moved into and through the rotating cylinder.
6. The method according to claim 3 wherein the inside diameter saw rotation is counter rotation of that of the rotating crystalline.
7. The method according to claim 1 wherein the sawing means is comprised of outside diameter saw.
8. The method according to claim 7 wherein the outside diameter saw rotation is counter rotation of that of the rotating crystalline.
9. The method according to claim 1 wherein the sawing means is comprised of multiple straight saw blades.
10. The method according to claim 1 wherein the sawing means is comprised of a continuous traveling wire which contacts the rotating cylinder in a counter direction to that of the rotation of the cylinder.
11. The method according to claim 10 wherein the continuous traveling wire contacts the rotating cylinder and the multiple points resulting in multiple sawing of off-orientation wafers.
12. The method according to claim 1 wherein the molding media is comprised of a molding material having similar hardness, density, sawing resistance, to that of the crystalline rod material.
13. The method according to claim 1 wherein the crystalline rod is composed of semiconductor material.
14. The method according to claim 1 wherein the crystalline rod is comprised of mineral material.
15. A method of point rotation sawing and lapping of crystalline rod at off-orientation angles comprising:
    determining the off-orientation angle of the rod relative to its crystallographic axis;
    encapsulating the rod in a molding media forming a cylindrical geometric encapsulation containing the rod with its crystallographic axis at an angle to the cylindrical axis, the angle being substantially equal to the predetermined off-orientation angle;
    rotating the cylinder about its axis;

contacting the rotating cylinder with a sawing means at one or more points tangent to the cylinder surface and perpendicular to the axis of rotation;

position the sawing means and cylinder in constant rotating point contact;

sawing and simultaneously lapping an off-orientation wafer from the cylinder.

16. The method according to claim 15 wherein the constant rotating point, off-orientation sawing plung rate is varied through control means.

17. The method for sawing and lapping thin off-orientation wafers according to claim 16 wherein the sawing and lapping means is comprised of an inside diameter saw with lapping coatings extended outwardly from the cutting surface and the rotation direction of the inner diameter saw is counter the rotation of the rod.

18. The method for sawing and lapping thin off-orientation wafers according to claim 16 wherein the sawing and lapping means is comprised of an outside diameter saw with lapping coatings on the saw surfaces extending inwardly from the cutting surface of the saw and the rotation of the saw being counter the rotation of the cylinder.

* * * * *